2,849,458
PRODUCTION OF SULFONATES

Isaac F. Walker, Hockessin, Del., assignor to E. I. du Pont de Nemours and Company, Wilmington, Del., a corporation of Delaware No Drawing. Application April 1, 1957
Serial No. 649,593

9 Claims. (Cl. 260—343.6)

This invention relates to new sulfonate compositions and methods for their preparation. More particularly, it relates to the production of new water-soluble dilactone sulfonates.

When an acetylene is reacted with carbon monoxide in the presence of a catalytic amount of cobalt carbonyl, as described in the copending application of J. C. Sauer, Serial No. 549,155, filed November 25, 1955, there is obtained a dilactone corresponding to $C_8(RR')_2O_4$ wherein R and R' are hydrogen, haloaryl, alkoxyaryl or hydrocarbon radicals free from non-aromatic unsaturation. This dilactone exists in a cis and a trans form as follows:

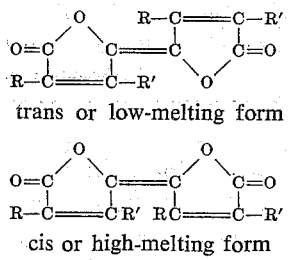

trans or low-melting form cis or high-melting form wherein R and R' have the meanings above indicated.

It is an object of this invention to provide new mono- and di-sulfonates of dilactones corresponding to $C_8(RR')_2O_4$ wherein R and R' are hydrogen, haloaryl, alkoxyaryl or hydrocarbon radicals free from non-aromatic unsaturation and methods for their preparation.

It is another object of this invention to provide new mono- and di-sulfonates of a dilactone corresponding to [$\Delta^{2,2'(5H,5'H)}$-bifuran]-5,5'-dione and methods for their preparation. Other objects of the invention will appear hereinafter.

It has now been found that when the $C_8(RR')_2O_4$ dilactones are reacted with a bisulfite there are obtained new mono- and di-sulfonates. This invention accordingly provides new mono- and di-sulfonates of a dilactone corresponding to $C_8(RR')_2O_4$ wherein R and R' have the above-indicated meanings and particularly new mono- and di-sulfonates of the dilactone, [$\Delta^{2,2'(5H,5'H)}$-bifuran]-5,5'-dione, and methods for their preparation.

In a convenient way for preparing these sulfonates, a reactor is charged with an aqueous solution of sodium bisulfite, the solution is heated and the [$\Delta^{2,2'(5H,5'H)}$-bifuran]-5,5'-dione is added stepwise with stirring. Heating is continued until the solution is homogeneous. The solution is permitted to cool to room temperature, and hydrochloric acid is then added to decompose excess sodium bisulfite. The solution is concentrated by distillation and the sodium sulfonate of the [$\Delta^{2,2'(5H,5'H)}$-bifuran]-5,5'-dione is isolated by extraction with methanol. If desired, however, the solution can be used as such or the salt can be separated therefrom either by adding an excess of acetone or by flashing off the methanol. The sodium sulfonate of the [$\Delta^{2,2'(5H,5'H)}$-bifuran]-5,5'-dione is hygroscopic.

The examples which follow are submitted to illustrate and not to limit this invention. Parts are by weight, unless otherwise specified.

Example I

One hundred (100) parts of the dilactone, [$\Delta^{2,2'(5H,5'H)}$-bifuran]-5,5'-dione, was added to a solution of 200 parts of sodium bisulfite and one part of sodium dodecyl sulfate in 2000 parts of water. The mixture was heated on the steam bath for thirty minutes and then filtered to give a pale orange solution of sulfonated dilactone and 12 parts of unreacted dilactone. The filtrate was evaporated to dryness to give a pale yellow solid which was highly water-soluble. Addition of hydrochloric acid to an aqueous solution of the sulfonated dilactone did not cause precipitation. In contrast, addition of hydrogen chloride to a solution of the dilactone in aqueous ammonium or sodium hydroxide caused immediate precipitation.

Example II

Forty-nine (49) parts of the dilactone, [$\Delta^{2,2'(5H,5'H)}$-bifuran]-5,5'-dione, was added to a solution of 100 parts of sodium bisulfite in 200 parts of water. A trace of sodium dodecyl sulfate was added to the solution to aid in wetting out the dilactone, which otherwise tended to float on the surface of the solution. The mixture was heated and stirred at 95°–100° C. for three hours, at which time the dilactone had dissolved completely. Fifty (50) parts of concentrated hydrochloric acid was added to the solution to decompose unreacted sodium bisulfite. The solution was evaporated until heavy precipitation of sodium chloride was observed. At this point, 200 parts of methanol was added to the solution and precipitated sodium chloride was removed by filtration. The filtrate was evaporated until a small amount of sodium chloride precipitated and another 200 parts of methanol was added. Precipitated sodium chloride was filtered off and the filtrate was evaporated to an amber syrup. This was slowly stirred into 3000 parts of acetone to precipitate the sulfonated dilactone. Filtration and drying gave 113 parts of a white solid which was highly soluble in water to give a strongly acid solution.

Example III

Sulfonated dilactone, prepared as in Example II, was dissolved in methoxyethanol to give a 5% solution by weight. This solution was heated to 125° C. and white desized fabric woven from "Dacron" polyester fiber was immersed therein for one minute. In the same manner, a piece of fabric was immersed in methoxyethanol at 125° C. for one minute. The fabrics were dried and heated for five minutes at 160° C. They were then washed in cold detergent solution and immersed for one minute in a boiling solution of 1% $Na_2CO_3$–0.1% sodium dodecyl sulfate. The fabrics were rinsed, dried, and ironed flat. Both samples were white, but the one treated with sulfonated dilactone felt considerably softer than the one treated only with methoxyethanol.

Example IV

Eighty-two (82) parts of [$\Delta^{2,2'(5H,5'H)}$-bifuran]-5,5'-dione was added to a solution of 208 parts of sodium bisulfite in 300 parts of water. A trace of "Triton" X–100 (octylphenoxypolyethoxyethanol) was added to expedite the wetting out of the dilactone. The mixture was heated and stirred at 100° C. for one hour until the reaction was substantially complete. Filtration gave 0.8 part of unreacted dilactone. The filtrate was reduced to about half its volume by distilling off water at 60° C. under reduced pressure. Five hundred (500) parts of methanol was added to the reaction product. A gummy precipitate was thereby formed. Gaseous hydrogen chloride was passed into the solution whereby the gum dissolved and sodium chloride precipitated. Filtration removed 117 parts of sodium chloride. The filtrate was again heated under reduced pressure to reduce it to about one-third its initial volume. The residue was diluted with 200 parts of ethanol and 300 parts of diethyl ether. The solution was saturated with gaseous hydrogen chloride and the small amount of sodium chloride which formed was filtered off.

The filtrate was reduced in volume at low pressure, finally being heated to 60° C. at a pressure of 2 mm. The product, sulfonated dilactone in the free acid form, consisted of 205 parts of an amber, viscous syrup.

Analysis of this product indicated it contained 12.6% moisture. After correction for moisture content, elemental analytical values for the product were 30.5% C, 3.7% H, and 18.2% S. The addition of two moles of $H_2SO_3$ to the dilactone would give the compound $C_8H_8O_{10}S_2$ which contains 29.2% C, 2.4% H, and 19.5% S. A possible structure for this compound would be

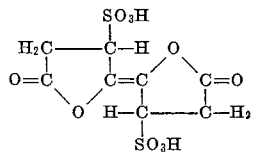

*Example V*

The acidic material prepared under Example IV was dissolved in water to give a 10% solution. This solution was found to give soluble salts of various heavy metal ions. The cold solution was found to dissolve calcium oxide and mercuric oxide readily and vanadium pentoxide and manganese dioxide slowly. The hot solution dissolved the vanadium and manganese oxides readily as well as hydrated alumina. Rusted steel was cleaned by immersion in the hot solution. Longer heating in the solution gave a continuous amber film over the surface of the steel.

*Example VI*

A solution of 120 parts of 28% ammonia in 300 parts of water was saturated with sulfur dioxide to a pH of 4. Eighty-two (82) parts of [$\Delta^{2,2'(5H,5'H)}$-bifuran]-5,5'-dione was added to the solution and a trace of "Triton" X-100 (octylphenoxypolyethoxyethanol) was added also to aid in wetting the dilactone. While sulfur dioxide was bubbled continuously through the mixture, it was heated with stirring to 95°–100° C. After one and one-half hours the dilactone was dissolved. The solution was filtered and evaporated to a thick syrup. This was poured into acetone with vigorous stirring to precipitate the ammonium salt of sulfonated dilactone. Filtration and drying gave 142 g. of pale yellow solid which was hygroscopic and highly water-soluble.

*Example VII*

Eighty-two (82) parts of dilactone was suspended in 500 parts of water containing a trace of the wetting agent of Example IV. The suspension was charged to an autoclave and pressured with sulfur dioxide gas to a pressure of 45 lb./sq. in. The mixture was heated gradually with agitation to 135° C. By this treatment, the dilactone dissolved to give a dark brown solution which was strongly acidic. Treatment of the solution with activated carbon did not decrease its color appreciably.

*Example VIII*

Thirty-eight (38) parts of the dimethyl dilactone, [$\Delta^{2,2'(5H,5'H)}$-bimethylfuran]-5,5'-dione, prepared as described in the copending application of J. C. Sauer, Serial No. 549,155, filed November 25, 1955, was dissolved in a solution of 84 parts of sodium bisulfite in 150 parts of water containing a trace of "Triton" X-100 (octylphenoxypolyethoxyethanol). This was accomplished by stirring at 95° C. for about one hour. The solution was filtered, brought to a pH of 1 with hydrogen chloride, evaporated on the steam bath to give a heavy deposit of sodium chloride and diluted with 200 parts of methanol. The solution was saturated with gaseous hydrogen chloride and sodium chloride was filtered off. The filtrate was evaporated to one-third its volume and diluted with 200 parts of methanol and 200 parts of dioxane. After being treated again with gaseous hydrogen chloride, the solution was filtered to remove additional sodium chloride which precipitated. The filtrate was evaporated to give an amber syrup which was free of chloride ions and which gave strongly acidic aqueous solutions.

*Example IX*

The sodium salt of sulfonated dilactone, prepared as in Example II and the ammonium salt prepared as in Example VI, decompose on heating to give voluminous foamy solids. In both instances decomposition began at about 250° C. It was very rapid at 350°–400° C.

This property was utilized to improve the fire-resistance of a commercial alkyd resin paint which consisted of 33 parts of pigment and 67 parts of vehicle. A sample consisting of 50 parts of such paint was ground with 15 parts of the product of Example II. A similar sample was ground with 15 parts of the product of Example VI. Films of the modified paints dried normally on metal and wood. Upon being exposed to flame, the films were found to expand and resist burning as the result of decomposition of the salts of the sulfonated dilactone.

The unsaturated dilactone [$\Delta^{2,2'(5H,5'H)}$-bifuran]-5,5'-dione used in Examples I, II, IV, VI and VII was prepared by charging into a steel pressure reactor of 400 cc. capacity 26 g. of acetylene, 200 ml. of acetone, and 1.5 g. of dicobalt octacarbonyl. The mixture was heated with carbon monoxide at a pressure of 1000 atmospheres for fourteen to seventeen hours. The product was filtered and the brown solid was extracted with ethyl acetate for twenty-four hours. The extract was permitted to crystallize and the crystalline material was separated and dried at room temperature. There was obtained 20 g. of the unsaturated dilactone, $C_8H_4O_4$, M. P. 229° C., after several recrystallizations from acetic acid.

The [$\Delta^{2,2'(5H,5'H)}$-bifuran]-5,5-dione exists in the form of two structural isomers, which yield suberic acid when hydrogenated with platinum in acetic acid. The normal or low melting form, 230°–237° C., is the trans form and the high melting form, 240°–248° C., is the cis form. The formulae of these structural isomers of [$\Delta^{2,2'(5H,5'H)}$-bifuran]-5,5'-dione are as follows:

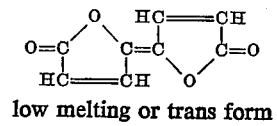

low melting or trans form

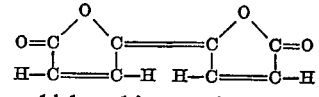

high melting or cis form

The dilactones used in preparing the sulfonates of this invention are the products obtained by reacting an acetylene with carbon monoxide in the presence of a cobalt carbonyl catalyst, as disclosed and claimed in the copending application of J. C. Sauer, Serial No. 549,155, filed November 25, 1955.

The acetylenes used in preparing these dilactones correspond to R—C≡C—R', in which R and R' are hydrogen, alkoxyaryl, especially where the alkoxy group is of not more than 12 carbon atoms and the aryl radical is hydrocarbon of not more than 10 carbon atoms, haloaryl especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing not more than 7 carbon atoms, aryl, especially where the aryl radical is hydrocarbon of not more than 10 carbon atoms, aralkyl, especially of not more than 7 carbon atoms; or cycloalkyl, particularly of not more than 7 carbon atoms. Examples of such radicals are methyl, ethyl, octyl, decyl, dodecyl, phenyl, tolyl, xylyl, naphthyl, benzyl, cyclohexyl, methylcyclohexyl, chlorophenyl, methoxyphenyl, ethoxyphenyl, decylphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

By employing such substituted acetylenes, there are obtained dilactones corresponding in molecular formula to $C_8(RR')_2O_4$, the radicals R and R' corresponding to the substituents attached to the triply bonded carbon in the acetylene reactant, i. e., R. and R' in R—C≡C—R'. Thus, as shown by the aforementioned Sauer application, there are prepared the following dilactones:

[$\Delta^{2,2'(5H,5'H)}$]-biphenylfuran]-5,5'-dione
[$\Delta^{2,2'(5H,5'H)}$]-bidiethylfuran]-5,5'-dione
[$\Delta^{2,2'(5H,5'H)}$]-bi-n-butylfuran]-5,5'-dione
[$\Delta^{2,2'(5H,5'H)}$]-bi-beta-naphthylfuran]-5,5'-dione
[$\Delta^{2,2'(5H,5'H)}$]-bichlorophenylfuran]-5,5'-dione
[$\Delta^{2,2'(5H,5'H)}$]-bi-o-methoxyphenylfuran]-5,5'-dione and the like.

The reaction between the acetylene and carbon monoxide is carried out batchwise or continuously in the presence of an inert organic liquid medium. By "inert organic liquid medium" is meant organic liquids which contain no active hydrogen, as defined by S. Siggia in his "Quantitative Organic Analysis Via Functional Groups," 2nd ed. (1954), page 78, chapter 7, and as determined by the Zerewitinoff method, Ber. 40, 2026 (1907), J. Am. Chem. Soc. 49, 3181 (1927). Specific organic reaction media are isooctane, toluene, acetonitrile, acetone, ethylacetate, dioxane, cyclohexanone, xylene, benzene, etc.

The cobalt carbonyl catalyst may be made directly by reaction of carbon monoxide with the metal in active form, as described in J. Am. Chem. Soc. 70, 383–6 (1948).

In preparing the sulfonates of this invention, at least one mole of the metal bisulfite per mole of dilactone, [$\Delta^{2,2'(5H,5'H)}$]-bifuran]-5,5'-dione, is used. Depending upon the ratio of bisulfite to dilactone there is obtained either the mono- or di-sulfonate. When the mole ratio of bisulfite to dilactone is 1:1, the monosulfonate is formed, and when it is 2:1, the product is the disulfonate. Excess of bisulfite over the stoichiometrically required quantities is destroyed by acidification. Hydrochloric acid is generally used in destroying excess bisulfite because of its availability and low cost.

The metal sulfonates of the dilactone are isolated by concentration of the solution following acidification and extraction with an alkanol, e. g., methanol. The metal sulfonate of the dilactone may be recovered from the alkanol solution either by adding an excess of non-solvent, e. g., acetone, or by flash-distilling the alkanol.

To produce the free sulfonic acid, gaseous hydrogen chloride is added to an organic solution of the sodium salt of the sulfonated dilactone. Isolation of the free acid in aqueous solution, i. e., by using an ion-exchange resin, is difficult because of the strongly acidic sulfonic acid groups in the product.

The metal bisulfites used in preparing the dilactone sulfonates of this invention are the water-soluble metal bisulfites, especially the alkali metal bisulfites such as sodium, potassium, lithium, and cesium bisulfites.

In preparing the sulfonates of this invention, the alkali metal bisulfite is dissolved in water and to this solution the dilactone is added with stirring while heating to about 50° C. to 150° C. Under these conditions the reaction is complete in about one hour.

The dilactone sulfonates of this invention are water-soluble.

Since it is obvious that many changes and modifications can be made in this invention without departing from the nature and spirit thereof, it is to be understood that this invention is not limited except as set forth in the appended claims.

I claim:

1. The sulfonate of a dilactone corresponding to $$C_8(RR')_2O_4$$

wherein R and R' are taken from the class consisting of hydrogen, haloaryl where the aryl radical is hydrocarbon of not more than 10 carbon atoms, alkoxyaryl where the alkoxy radical is of not more than 12 carbon atoms, and the aryl radical is hydrocarbon of not more than 10 carbon atoms, and monovalent hydrocarbon radicals, free from non-aromatic unsaturation, of not more than 12 carbon atoms.

2. The mono-sulfonate of a dilactone corresponding to $C_8(RR')_2O_4$ wherein R and R' are taken from the class consisting of hydrogen, haloaryl where the aryl radical is hydrocarbon of not more than 10 carbon atoms, alkoxyaryl where the alkoxy radical is of not more than 12 carbon atoms, and the aryl radical is hydrocarbon of not more than 10 carbon atoms, and monovalent hydrocarbon radicals, free from non-aromatic unsaturation, of not more than 12 carbon atoms.

3. The di-sulfonate of a dilactone corresponding to $C_8(RR')_2O_4$ wherein R and R' are taken from the class consisting of hydrogen, haloaryl where the aryl radical is hydrocarbon of not more than 10 carbon atoms, alkoxyaryl where the alkoxy radical is of not more than 12 carbon atoms, and the aryl radical is hydrocarbon of not more than 10 carbon atoms, and monovalent hydrocarbon radicals, free from non-aromatic unsaturation, of not more than 12 carbon atoms.

4. The sulfonate of [$\Delta^{2,2'(5H,5'H)}$-bifuran]-5,5'-dione.

5. The process for producing dilactone sulfonates which comprises heating to a temperature between 50° C. and 150° C. a mixture of a dilactone corresponding to $$C_8(RR')_2O_4$$

wherein R and R' are taken from the class consisting of hydrogen, haloaryl where the aryl radical is hydrocarbon of not more than 10 carbon atoms, alkoxyaryl where the alkoxy radical is of not more than 12 carbon atoms, and the aryl radical is hydrocarbon of not more than 10 carbon atoms, and monovalent hydrocarbon radicals, free from non-aromatic unsaturation, of not more than 12 carbon atoms, and an aqueous solution of a metal bisulfite.

6. The process of claim 5 in which excess bisulfite is decomposed by addition of HCl.

7. The proces of claim 5 in which excess bisulfite is decomposed by addition of HCl and the dilactone sulfonate isolated by extraction with methanol.

8. The process of claim 5 in which the dilactone and bisulfite in said mixture are present in equimolar amounts.

9. The process of claim 5 in which the molar ratio of bisulfite to dilactone is at least 2:1.

References Cited in the file of this patent

Chem. Abst., 46, page 1794 (1952).